United States Patent
Mueller

(10) Patent No.: US 8,111,882 B2
(45) Date of Patent: Feb. 7, 2012

(54) METHOD FOR VERIFYING A FINGERPRINT

(75) Inventor: Robert Mueller, Riemerling (DE)

(73) Assignee: Giesecke & Devrient GmbH, Munich (DE)

( * ) Notice: Subject to any disclaimer, the term of this patent is extended or adjusted under 35 U.S.C. 154(b) by 1560 days.

(21) Appl. No.: 10/478,643

(22) PCT Filed: May 27, 2002

(86) PCT No.: PCT/EP02/05801
§ 371 (c)(1),
(2), (4) Date: May 28, 2004

(87) PCT Pub. No.: WO02/097712
PCT Pub. Date: Dec. 5, 2002

(65) Prior Publication Data
US 2004/0234111 A1    Nov. 25, 2004

(30) Foreign Application Priority Data
May 30, 2001   (DE) ................................. 101 26 369

(51) Int. Cl.
*G06K 9/00* (2006.01)

(52) U.S. Cl. ............ 382/124; 382/115; 283/68; 283/78; 340/5.83; 340/5.53; 396/15; 902/3; 713/186

(58) Field of Classification Search ................... 382/124
See application file for complete search history.

(56) References Cited

U.S. PATENT DOCUMENTS

| | | | | |
|---|---|---|---|---|
| 4,156,230 A * | 5/1979 | Riganati et al. | ............... | 382/124 |
| 4,607,384 A * | 8/1986 | Brooks | .......................... | 382/124 |
| 4,995,086 A * | 2/1991 | Lilley et al. | .................... | 382/124 |
| 5,259,025 A * | 11/1993 | Monroe et al. | .................. | 705/75 |
| 5,321,765 A * | 6/1994 | Costello | ........................ | 382/125 |

(Continued)

FOREIGN PATENT DOCUMENTS
DE          198 11 332 A     9/1999
(Continued)

OTHER PUBLICATIONS

Stosz et al., "Automated system for fingerprint authentication using pores and ridge structure," Oct. 1994, Proceedings of SPIE, vol. 2277, pp. 210-223.*

*Primary Examiner* — John Lee
(74) *Attorney, Agent, or Firm* — Rothwell, Figg, Ernst & Manbeck, P.C.

(57) ABSTRACT

The invention relates to a method for testing a fingerprint whose reference data are stored in a portable data carrier. The reference data contain at least positions and orientations of minutiae and pores and an orientation vector. According to the invention it is provided that the testing of the fingerprint includes first sensing measuring values stating the actual value of the sensed fingerprint and extracting the minutiae and the pores from said measuring values. Then the reference data of the minutiae and the orientation vector are read from the portable data carrier and the minutiae from the sensed fingerprint compared with the corresponding reference data. Subsequently, the position of the pores relative to the minutiae is transmitted to the portable data carrier and the pores are checked in the portable data carrier.

9 Claims, 3 Drawing Sheets

U.S. PATENT DOCUMENTS

| | | | |
|---|---|---|---|
| 5,982,914 A | 11/1999 | Lapsley | |
| 6,011,858 A * | 1/2000 | Stock et al. | 382/115 |
| 6,219,439 B1 * | 4/2001 | Burger | 382/115 |
| 6,496,595 B1 * | 12/2002 | Puchek et al. | 382/124 |
| 6,636,620 B1 * | 10/2003 | Hoshino | 382/124 |
| 6,795,569 B1 * | 9/2004 | Setlak | 382/124 |
| 2002/0150282 A1 * | 10/2002 | Kinsella | 382/124 |
| 2002/0150283 A1 * | 10/2002 | Mimura et al. | 382/124 |
| 2003/0039382 A1 * | 2/2003 | Yau et al. | 382/125 |

FOREIGN PATENT DOCUMENTS

| | | |
|---|---|---|
| EP | 0 736 836 A | 10/1996 |
| WO | WO 94/25938 A | 11/1994 |
| WO | WO 9425938 A1 * | 11/1994 |

* cited by examiner

METHOD FOR VERIFYING A FINGERPRINT

CROSS-REFERENCE TO RELATED APPLICATION

This application is a §371 of PCT Application Serial No. PCT/EP02/05801, filed May 27, 2002.

BACKGROUND OF THE INVENTION

1. Field of the Invention

This invention relates to a method for testing a fingerprint.

2. Description of the Background Art

Fingerprint testing is gaining more and more importance in connection with the use of chip cards used for identifying and verifying authorized persons, for example in access controls or the performing of financial transactions.

Checking the fingerprint substantially replaces PIN entry in such cases, the advantages being that the user does not have to remember any combination of numbers and security is increased since a fingerprint, unlike a PIN, cannot be spied out or found by trial.

For checking the fingerprint it is known to provide terminals equipped with a sensor for sensing the fingerprint. The sensed fingerprint is compared either in the terminal or on the chip card with a fingerprint stored on the chip card. Such assemblies are known for example from EP-A 0 343 580.

Since evaluation of a fingerprint exceeds the computing power that can be realized on a chip card, evaluation is usually done in the terminal. However, calculation in the terminal has the disadvantage that the reference values stored in the chip card are sent outside, making it possible for unauthorized third parties to determine the reference values as they are stored in the chip card by interception or other kinds of attacks.

To avoid the abovementioned disadvantages it was proposed in DE-A 198 11 332 to perform all security-relevant operations within the data carrier and only swap out computing-intensive operations if the swap does not endanger security. In the swap the chip card specifies which data are transmitted from the terminal to the data carrier in what form. In particular, the terminal performs a pre-evaluation of the measuring values in the course of which temporary results obtained from the measuring values are linked with data that were transmitted to the terminal from the data carrier. The terminal then only transmits the result of linking to the data carrier, in which it can be checked with comparatively little effort on the basis of the linking results whether the detected biometric feature comes from an authorized user.

SUMMARY OF THE INVENTION

Advantageous embodiments of the invention are stated in the dependent claims.

The invention provides a method for testing a fingerprint wherein reference data containing at least the positions and orientations of minutiae and pores and an orientation vector are stored in a portable data carrier. During testing of a fingerprint the measuring values determining the actual value of the currently sensed fingerprint are first sensed. The minutiae and the pores are extracted from said measuring values. For checking the minutiae the corresponding reference data and the orientation vector are read from the portable data carrier so that the minutiae of the sensed fingerprint can be compared with the corresponding reference data.

For further checking within the portable data carrier, the position of the pores or their position relative to the minutiae is transmitted to the data carrier, i.e. the check of the pores is done in the portable data carrier. The inventive method involves a division of labor for checking a fingerprint by which the check of the minutiae, which is comparatively computing-intensive, is preferably done in the terminal while the check of the pores is done in the portable data carrier, e.g. a chip card, which has less computing power. Since a check of the pores is a necessary part of the checking method, no loss of security is suffered by the computing-intensive minutiae test being done in an external device.

A further simplification of the calculation within the portable data carrier is obtained if a positional and rotational deviation of the orientation vector is calculated in the external device, an orientation point is determined therefrom, said point is sent to the portable data carrier, and the position of the pores relative to the minutiae compared with the reference values there. This permits the time for calculation within the portable data carrier to be further reduced. It has further proved advantageous that the starting point of the orientation vector is the centroid of the minutiae coordinates or the center of a fingerprint. This choice of the starting point facilitates later sorting of the minutiae or pores.

To increase the security in evaluation, the ridge counts can additionally be stored in the portable data carrier as part of the reference data record so that the ridge counts can also be taken into account in the check of the fingerprint.

Further, a comparative data record containing the coordinates of the pores relative to the starting point of the orientation vector can preferably be generated in the external device.

A further advantageous embodiment of the invention provides that the relative coordinates are sorted according to distance and/or angle relative to the starting point. The sorting simplifies the check of the fingerprint since the sorting already specifies a favorable order for testing the individual minutiae or pores.

An increase in security can also be obtained by additionally recording and evaluating the ridge counts between the starting point and the pores. This additional feature of ridges between starting point and pores can be evaluated either in the external device or in the portable data carrier.

To increase security, it can further be provided that the orientation data record is readable in the chip card but the comparative data record is stored in unreadable fashion.

BRIEF DESCRIPTION OF THE DRAWINGS

Hereinafter the invention will be set forth in more detail with reference to FIGS. 1 to 5, in which.

DETAILED DESCRIPTION OF THE INVENTION

Figure 1:
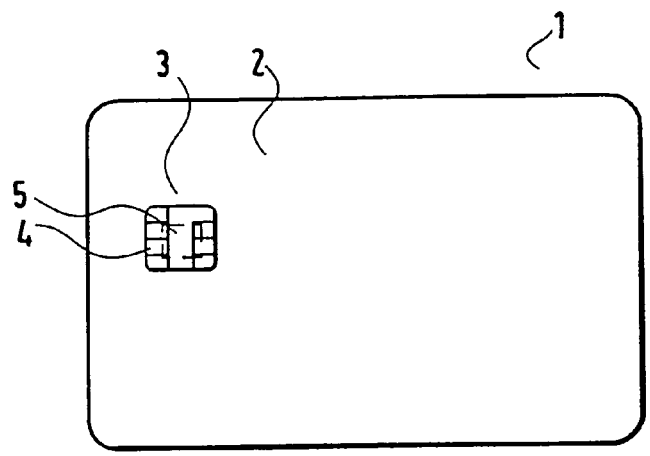
FIG. 1 shows a chip card in a front view.

FIG. 1 shows a front view of chip card 1 as an example of a portable data carrier. Chip card 1 consists card body 2 and chip module 3 disposed in a gap of card body 2. Chip module 3 consists of contact bank 4 and integrated circuit 5 disposed below contact bank 4. The dimensions of chip card 1 are defined e.g. by ISO standard 7810 and the mode of functioning of integrated circuit 5 is for example compatible with ISO standard 7816. Chip card 1 can be provided as an ID card for access control for a building or as an authorization card for access to an electric device, for example a computer. Further, chip card 1 can be a bank card, credit card, check card or the like with which financial transactions can be performed.

Besides chip card 1 shown in FIG. 1, the invention can also be used in connection with other chip cards or any other data carriers capable of storing data.

Figure 2:
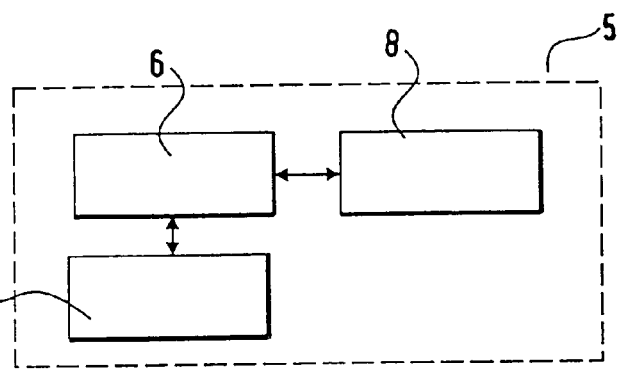
FIG. 2 shows a block diagram of the integrated circuit of the chip card from FIG. 1.

FIG. 2 shows a simplified block diagram of integrated circuit 5 of chip card 1 shown in FIG. 1. Integrated circuit 5 is a microprocessor capable of performing calculations independently. Integrated circuit 5 consists of central processing unit 6, memory 7 and input/output device 8. Central processing unit 6 is connected for the purpose of data exchange both with memory 7 and with input/output device 8. Central processing unit 6 controls the functioning of integrated circuit 5, normally resorting to commands stored in memory 7. Memory 7 can be executed as a nonvolatile memory, normally a ROM or EEPROM, or as a volatile memory (RAM). Usually both a volatile and a nonvolatile memory are present simultaneously. The commands executed by central processing unit 6 are usually stored in the ROM, partly also in the EEPROM. The EEPROM in addition stores the reference values for the PIN or for the biometric feature and further data required for the application. The RAM serves as a working memory in which data required at the moment are temporarily buffered.

The data exchange between integrated circuit 5 and the outside world is effected via input/output device 8, which is executed for example as a serial interface and electrically connected with the contact of contact bank 4 provided for input/output of data. The inventive method does not necessarily require that the data exchange between integrated circuit 5 and the outside world is handled via contact bank 4. Instead, a contactless chip card can also be used, by which data exchange is effected not via contact bank 4 but for example via an antenna coil or electric coupling surfaces.

Although this is not explicitly shown in FIG. 1, chip card 1 can have a fingerprint sensor for detecting the fingerprint by measurement technology. Said sensor would then be mounted at a suitable place on card body 2. However, the fingerprint sensor will normally be mounted on the terminal, as shown in FIG. 3, since fingerprint sensors suitable for integration in chip cards 1 are not very readily available at present.

Figure 3:
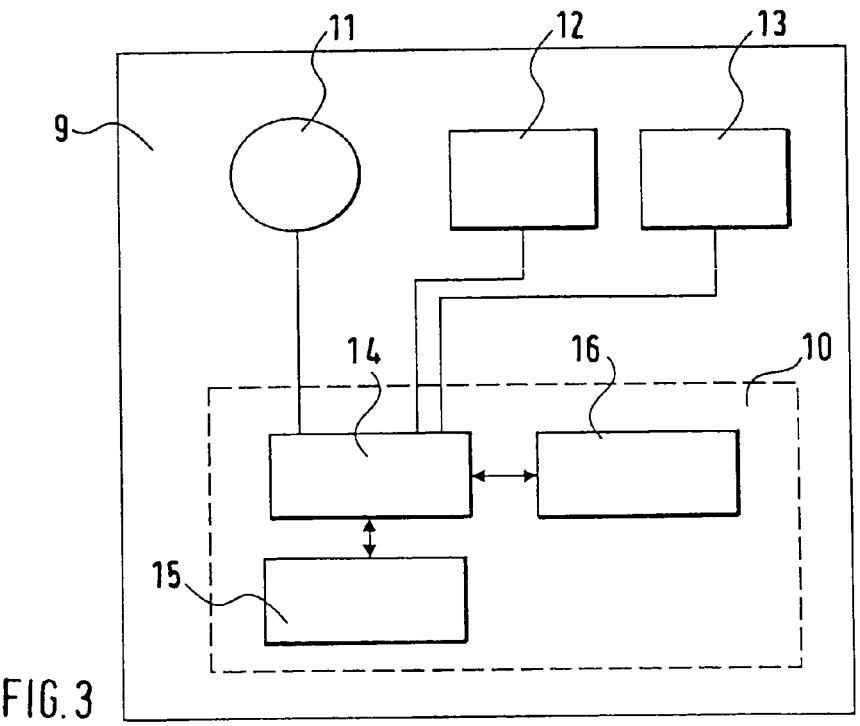
FIG. 3 shows a block diagram of a terminal.

FIG. 3 shows a block diagram of terminal 9 with which chip card 1 enters into data exchange. Terminal 9 has integrated circuit 10 and fingerprint sensor 11, keyboard 12 and display 13. Fingerprint sensor 11 can be omitted in the variant of the invention where the chip card has its own fingerprint sensor. Integrated circuit 10 of terminal 9, in analogy to integrated circuit 5 of chip card 1, has central processing unit 14 connected with memory 15 and input/output device 16. Further, central processing unit 14 is also connected with fingerprint sensor 11, with keyboard 12 and display 13.

Fingerprint sensor 11 can be used to detect a fingerprint of the user by measurement technology. The thus determined data can then be processed in central processing unit 14 and the result of said processing can be transmitted via input/output device 16 to corresponding input/output device 8 of integrated circuit 5 of chip card 1. Likewise, central processing unit 14 can receive data from integrated circuit 5 of chip card 1 via the two input/output devices 8 and 16. Via keyboard 12 the user can manually input data required for the particular application. The particular data input required can be indicated on display 13.

To prevent abusive use of chip card 1 by an unauthorized third party, for example in case of loss or theft of chip card 1, the use of chip card 1 is possible only subsequent to positive identification or verification of the fingerprint. Identification via this biometric feature replaces or supplements authentication of the user by input of a secret personal identification number (PIN) as is usual with chip cards 1. A reference value for said identification number is stored in memory 7 of integrated circuit 5 so as to be inaccessible from outside and is compared with the inputted identification number. Analogously, reference values for the fingerprint are stored according to the invention in memory 7 of integrated circuit 5, which are used in the testing of the measuring values. If the PIN comparison or testing of the fingerprint is positive, chip card 1 is enabled for use. Otherwise a certain number of further attempts is normally permitted and if these attempts are not positive either, the chip card is blocked.

Figure 4A:
FIG. 4 shows fingerprints in different enlargements.

FIG. 4a shows fingerprint 17 with center 18 and minutiae 19. During evaluation of the fingerprints, the fingerprint is first detected by measurement technology and distinctive details of the fingerprint subsequently extracted from the obtained measuring values. Distinctive features of a fingerprint are for example minutiae. Minutiae are characteristic points or forms of the fingerprint ridges, for example ridge bifurcations 20 or ridge ending points 21.

Figure 4B:

Further distinctive features of a fingerprint are the pores, which are depicted in FIG. 4b showing an enlarged detail of a fingerprint. The pores of fingerprint 1 are marked by 22 here.

For evaluation, the coordinates and the kind of minutiae, for example, can be determined and compared with corresponding reference data. The corresponding reference data are stored in the portable data carrier in tabular form, as shown in Tables 1 and 2.

TABLE 1 for n minutiae:

| $x_1$ | $y_1$ | $t_1\|\alpha_1$ | $r_{11}$ | $r_{12}$ | $r_{13}$ | $r_{14}$ | ... | $r_{1,20}$ |
|---|---|---|---|---|---|---|---|---|
| $x_2$ | $x_2$ | $t_2\|\alpha_2$ | $r_{21}$ | $r_{22}$ | $r_{23}$ | $r_{24}$ | ... | $r_{2,20}$ |
| $x_3$ | $x_3$ | $t_3\|\alpha_3$ | $r_{31}$ | $r_{32}$ | $r_{33}$ | $r_{34}$ | ... | $r_{3,20}$ |
| $X_n$ | $Y_n$ | $t_n\|\alpha_n$ | $r_{n1}$ | $r_{n2}$ | $r_{n3}$ | $r_{n4}$ | ... | $r_{n,20}$ |

TABLE 2 for m pores:

| $x_1$ | $y_1$ |
|---|---|
| $x_2$ | $x_2$ |
| $x_3$ | $x_3$ |
| $x_m$ | $y_m$ |

In Tables 1 and 2, $x_i$ and $y_i$ designate the positions of the ith minutia or pore. In Table 1, $t|\alpha$ moreover states the type and direction of the minutia, these data being stored in compressed form, preferably in one byte in the memory of the chip card. The ridge counts of the ith minutia with respect to the yth neighbor is stated as $r_{ij}$. The table contains a total number n of minutiae (Table 1), the total number of pores considered being m. Moreover, the tables also store the coordinates of the reference point ($x_{com}$, $y_{com}$) and the direction of the reference vector ($\alpha_{com}$).

Figure 5:
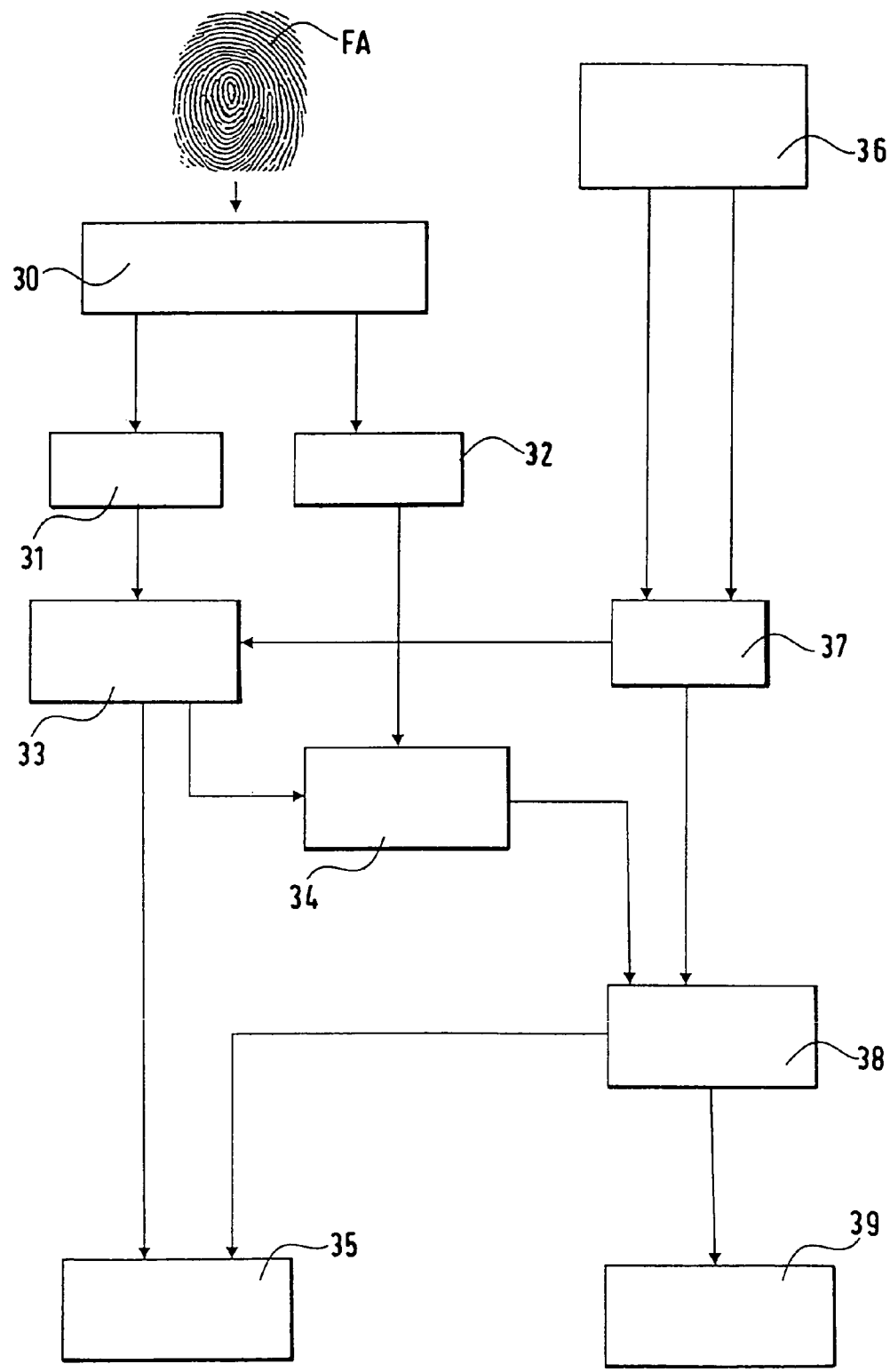
FIG. 5 shows the example of a flowchart according to the inventive method.

FIG. 5 finally shows a flowchart indicating the basic procedure for verifying a fingerprint.

First, fingerprint 1 is sensed by a sensor in first step 30 and the distinctive features are extracted. A division into minutiae (step 31) and pores (step 32) is thereby effected. The check of the minutiae is done in the terminal in step 33. For the check the reference data relating to the minutiae, which were made available separately according to minutiae and pore information in step 36, are transmitted from the chip card to the terminal via an interface in step 37.

In dependence on the check result in step 33, the verification is either aborted (step 35) if the minutiae detected or extracted from the fingerprint do not match the reference data stored in the chip card.

During the check of the minutiae a matching pair of minutiae is first sought and the position used to determine an offset and optionally a rotation angle of the fingerprint. Offset and rotation angle are taken as a basis for the further check, whereby a correction of offset and rotation angle can be made after the check of further minutiae.

In the case of a match, step 33 yields an offset and a rotation angle that are made available for following step 34. In this step, the offset and rotation angle that were determined in the minutiae check are used to generate relative positions with respect to the position of the minutiae, said positions being transmitted to the chip card.

In the chip card a comparison of the currently sensed pores with the reference data of the pores is thereupon performed in step 38. Here, too, either the process of verification is aborted (step 35) or the check is terminated successfully with step 39, i.e. access to the card data and thus to the desired services is granted, in dependence on the result of comparison.

The inventive method makes it possible for the comparatively elaborate minutiae check to be effected in a terminal while the less elaborate check of the pores is done in the chip card.

The invention claimed is:

1. A method for testing a fingerprint whose reference data are stored in a portable data carrier that is adapted to exchange data with a terminal, the reference data containing at least positions and orientations of minutiae and pores and an orientation vector, the method comprising:

sensing measuring values stating the actual value of the sensed fingerprint, extracting the minutiae and the pores from the measuring values, thereby effecting a division into minutiae and pores, transmitting the reference data of the minutiae and the orientation vector from the portable data carrier to the terminal, comparing, by an integrated circuit in the terminal, the minutiae from the sensed fingerprint with the corresponding reference data, transmitting the position of the pores from the sensed fingerprint relative to the minutiae from the terminal to the portable data carrier, comparing, by an integrated circuit in the portable data carrier being different from the integrated circuit in the terminal, the pores from the sensed fingerprint with the corresponding reference data, and granting access to data or a desired service depending upon the result of the pore comparison.

2. The method according to claim 1, characterized in that a positional and rotational deviation of the orientation vector is calculated and used to determine an orientation point which is used to generate the pore data record which is evaluated in the data carrier.

3. The method according to claim 1, characterized in that the centroid of the minutiae or the center of the fingerprint is used as the starting point of the orientation vector.

4. The method according to claim 1, characterized in that the ridge count between minutiae is additionally used in the generation of the reference data record and/or in the check of the fingerprint.

5. The method according to claim 1, characterized in that a comparative data record is generated that contains the coordinates of the pores relative to the starting point of the orientation vector.

6. The method according to claim 1, characterized in that the relative coordinates are sorted according to distance and/or angle relative to the starting point.

7. The method according to claim 1, characterized in that the ridge count between the starting point and the pores is recorded or evaluated.

8. The method according to claim 5, characterized in that the orientation data record is stored in the chip card in readable fashion while the comparative data record is stored in unreadable fashion.

9. The method according to claim 1, wherein the portable data carrier is a chip card.

* * * * *